US012559397B2

(12) United States Patent
      Shires

(10) Patent No.:    US 12,559,397 B2
(45) Date of Patent:         Feb. 24, 2026

(54) SUBMERGED MEMBRANE UNIT WITH SINGLE DROP AERATION

(71) Applicant: PB Equipment Inc., Georgetown, TX (US)

(72) Inventor: Derek Michael Shires, Bartlett, TX (US)

( * ) Notice: Subject to any disclaimer, the term of this patent is extended or adjusted under 35 U.S.C. 154(b) by 569 days.

(21) Appl. No.: 17/513,682

(22) Filed: Oct. 28, 2021

(65) Prior Publication Data

US 2022/0135456 A1      May 5, 2022

Related U.S. Application Data

(60) Provisional application No. 63/107,825, filed on Oct. 30, 2020.

(51) Int. Cl.
*C02F 3/12*          (2023.01)
*B01D 63/08*         (2006.01)
*C02F 3/20*          (2023.01)

(52) U.S. Cl.
CPC ........ *C02F 3/1273* (2013.01); *B01D 63/0821* (2022.08); *C02F 3/208* (2013.01); *C02F 2201/005* (2013.01); *C02F 2203/006* (2013.01); *C02F 2303/16* (2013.01)

(58) Field of Classification Search
CPC .............. B01D 63/082; B01D 63/0821; B01D 2313/26; B01D 2315/06; B01D 2321/185; C02F 3/1273; C02F 3/208; C02F 2201/005; C02F 2203/006; C02F 2303/16
See application file for complete search history.

(56) References Cited

U.S. PATENT DOCUMENTS

| | | | |
|---|---|---|---|
| 3,679,187 | A | 7/1972 | Smith |
| 4,720,360 | A | 1/1988 | Melber |
| 8,840,783 | B2 | 9/2014 | Zha et al. |
| 9,862,628 | B2 | 1/2018 | Livingston et al. |

FOREIGN PATENT DOCUMENTS

| | | | | |
|---|---|---|---|---|
| DE | 29624447 U1 | * | 2/2004 | ............. B01D 61/14 |
| WO | WO-2018184057 A1 | * | 10/2018 | |

OTHER PUBLICATIONS

DE29624447U1—EPO Machine Translation (Year: 2025).*

* cited by examiner

*Primary Examiner* — Patrick Orme
(74) *Attorney, Agent, or Firm* — Ferguson Braswell Fraser Kubasta PC

(57)                ABSTRACT

A device including a housing having a first side, a second side opposed to the first side, and a wall disposed between the first side and the second side. The wall forms at least a partially enclosed space inside the housing. The device also includes a membrane mounted to the wall inside the housing. The device also includes a drop pipe disposed inside the housing and through or around the membrane, the drop pipe having a proximal end and a distal end, the distal end being closer to the second side than the proximal end. The device also includes a diffuser connected to the distal end of the drop pipe.

20 Claims, 9 Drawing Sheets

START

USING A DEVICE BY PUMPING A GAS THROUGH THE DROP PIPE AND THROUGH THE DIFFUSER INTO THE WATER SUCH THAT BUBBLES EMERGING FROM THE DIFFUSER RISE THROUGH THE MEMBRANE ARRAY BEFORE REACHING A SURFACE OF THE WATER — 1000

FILTER THE WATER THROUGH PORES IN THE MEMBRANE ARRAY — 1002

END

SUBMERGED MEMBRANE UNIT WITH SINGLE DROP AERATION

CROSS-REFERENCE TO RELATED APPLICATIONS

This application claims priority based on 35 U.S.C. § 119(e) to U.S. Provisional Patent Application 63/107,825, filed Oct. 30, 2020, the entirety of which is hereby incorporated by reference.

BACKGROUND

Devices known as submerged membrane units (SMU's) may be used to treat water or wastewater to separate solids and liquids. However, SMU's may utilize diffused air aeration systems to prevent membrane fouling and clogging. These aeration devices are prone to clogging. The result may be extensive regular maintenance.

SUMMARY

The one or more embodiments provide for a device. The device includes a housing having a first side, a second side opposed to the first side, and a wall disposed between the first side and the second side. The wall forms at least a partially enclosed space inside the housing. The device also includes a membrane mounted to the wall inside the housing. The device also includes a drop pipe disposed inside the housing and through or around the membrane, the drop pipe having a proximal end and a distal end, the distal end being closer to the second side than the proximal end. The device also includes a diffuser connected to the distal end of the drop pipe.

The one or more embodiments also provide for a water treatment system. The water treatment system includes a clarifier stage and a device disposed within the clarifier stage. The device includes a housing having a first side, a second side opposed to the first side, and a wall disposed between the first side and the second side. The wall forms at least a partially enclosed space inside the housing. The device also includes a membrane mounted to the wall inside the housing. The device also includes a drop pipe disposed inside the housing and through the membrane, the drop pipe having a proximal end and a distal end, the distal end being closer to the second side than the proximal end. The device also includes a diffuser connected to the distal end of the drop pipe. The device also includes a gas pump connected to the drop pipe and configured to pump gas through the drop pipe.

The one or more embodiments also provide for a method of treating water using a device. The method includes using the device. The device includes a housing having a first side, a second side opposed to the first side, and a wall disposed between the first side and the second side. The wall forms at least a partially enclosed space inside the housing. The device also includes a membrane array mounted to the wall inside the housing. The device also includes a drop pipe disposed inside the housing and through the membrane array, the drop pipe having a proximal end and a distal end, the distal end being closer to the second side than the proximal end. The device also includes a diffuser connected to the distal end of the drop pipe. The drop pipe and the diffuser extend into the water. The method also includes pumping a gas through the drop pipe and through the diffuser into the water such that bubbles emerging from the diffuser rise through the membrane array before reaching a surface of the water.

Other aspects of the one or more embodiments will be apparent from the following description and the appended claims.

DETAILED DESCRIPTION

Figure 1:
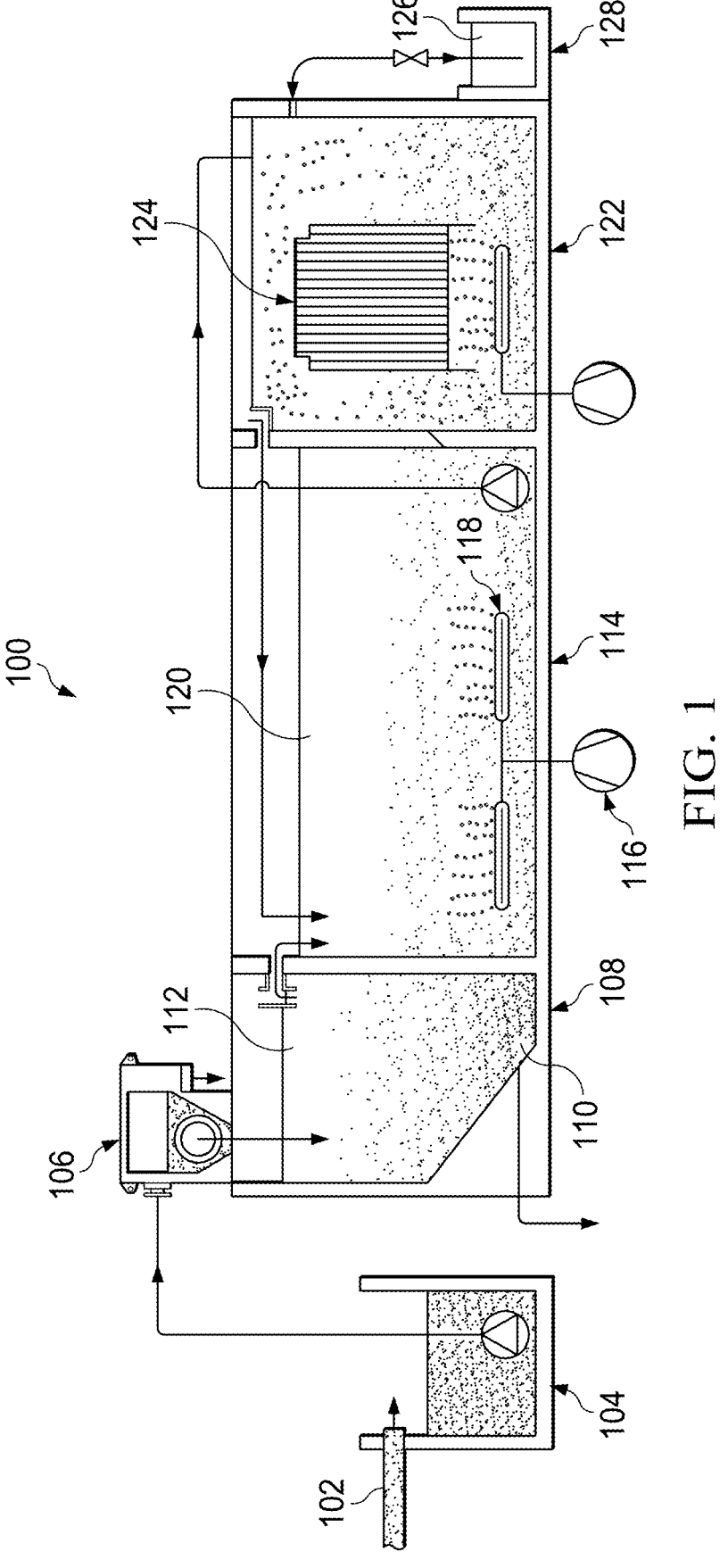
FIG. 1 shows a wastewater treatment system, in accordance with one or more embodiments.

Specific embodiments will now be described in detail with reference to the accompanying figures. Like elements in the various figures are denoted by like reference numerals for consistency.

In general, the one or more embodiments relate to water treatment devices, systems, and methods. In particular, the one or more embodiments are directed to a SMU with single drop aeration.

A submerged membrane unit (SMU) is a device used in a water or wastewater treatment process. Water containing solids is passed over or through the membranes. Small pores in the membranes filter fine particles in the water, preventing the fine particles from entering into the membranes. The water, however, passes through the pores and into the membranes. The filtered water, referred to as permeate, is then pumped or flows by gravity to another system for further treatment or (in some applications) is discharged as effluent.

As indicated above, a problem can arise in submerged membrane devices. In particular, movement of water through the membranes helps prevent membrane clogging. The aeration device that provides this circulation is prerequisite to permeation. However, these aeration devices are, themselves, prone to clogging. When the aeration system and membranes are sufficiently clogged, the SMU and possibly the entire water treatment system, may be shut down in order to facilitate cleaning of the diffusers, membranes, and/or other components of the system. Excessive cleaning may be time consuming, difficult, and/or expensive, and thus may be considered undesirable.

The one or more embodiments address these and other technical challenges by providing for a drop pipe gas line that passes through or around the membrane array to a diffuser below the membrane array. Gas (e.g., air, oxygen gas, etc.) is pumped through the drop pipe gas line and through the diffuser. The diffuser is disposed beneath the water line and beneath the membranes. The gas passes through the diffuser, forming bubbles in the water that then rise upwardly to and through the membrane array. As a result, waste that attempts to accumulate on the membranes is urged away from the membrane pores. Accordingly, the membrane aeration unit is less likely to become clogged, cleaning is easier and may be cleaned on a more infrequent basis. The drop lines also allow for additional aeration of the wastewater, additional mixing of the wastewater, as well as providing continual external cleansing of the membranes.

Attention is now turned to the figures. FIG. 1 shows a wastewater treatment system (100), in accordance with one or more embodiments. The wastewater treatment system (100) is used to filter wastewater (e.g. sewage or mixed liquor) so that the contaminants may be discarded, and the treated water discharged or recycled. The wastewater treatment system (100) shown in FIG. 1 is only an exemplary system. Many different types of water and wastewater treatment systems exist, and any particular water treatment system may have more or fewer treatment stages or unit processes.

In the example of FIG. 1, wastewater (102) (e.g., raw sewage) is pumped into a buffer tank (104). Use of the buffer tank (104) allows the water treatment system (100) to control the rate at which the wastewater (102) is pumped into the remaining stages of the wastewater treatment system (100).

The wastewater (102) is then pumped into a screening unit (106). The screening unit (106) may take many different forms, such as but not limited to one or more screens, conveyors, etc. The screening unit (106) removes large objects (stones, lost jewelry, sticks, bones, etc.) that may have entered with the wastewater (102). The large objects are collected and discarded properly.

Additionally, heavier particulates, but which are too small to be removed by the screening unit (106), may settle in the bottom of a pre-treatment tank (108) in the form of sludge (110). The sludge (110) may be pumped from the pre-treatment tank (108), possibly further treated, and then discarded properly.

Next, remaining wastewater (112) is pumped or flows via gravity to an aeration tank (114). The aeration tank (114) is connected to a gas line (116) that feeds gas (e.g., air or oxygen) to one or more diffusers (118). The diffusers (118) force the gas into the water. The gas forms bubbles which rise to the surface of the water in the aeration tank (114). In this manner, the remaining wastewater (112) becomes aerated water (120). Aeration reduces the amount of organic matter and microorganisms, increases oxygen content for future biological processing, speeds organic decomposition, and induces other useful changes in the remaining wastewater (112).

The aerated water (120) is then pumped or flows via gravity to a MBR basin (122). The term "MBR" stands for "membrane bioreactor." The MBR basin (122) holds water as well as one or more SMU's, such as SMU (124).

The aerated water (120) flows through the SMU (124). Fine particulates in the aerated water (120) are filtered by pores in the membranes. Thus, filtered water passes through the pores and into the membranes, but the solids remain in the MBR basin (122). The solids may be removed and discarded properly, or pumped or flow via gravity back into the aeration tank (114).

The filtered water that passes through the membrane is known as permeate (126). Water that is ultimately discharged from the water treatment system (100) and approved for recycling is known as treated effluent. Thus, in some cases, the permeate may be considered clean enough for a recycling use and may be deemed treated effluent. However, the permeate (126) may be subject to further treatment in some embodiments before being discharged as treated effluent.

The water treatment system (100) may be considered a system of stages. Together, the buffer tank (104), the screening unit (106) and the pre-treatment tank (108) may be referred to as a pre-treatment stage. Together, the aeration tank (114) and the MBR basin (122), as well as the devices in the aeration tank (114) and the MBR basin (122), may be referred to as a clarifier stage. In different embodiments, each separate system (e.g., the screening unit (106), the pre-treatment tank (108), the aeration tank (114), the MBR basin (122)) may be referred to as a unit process, stage or a sub-stage.

Figure 2:
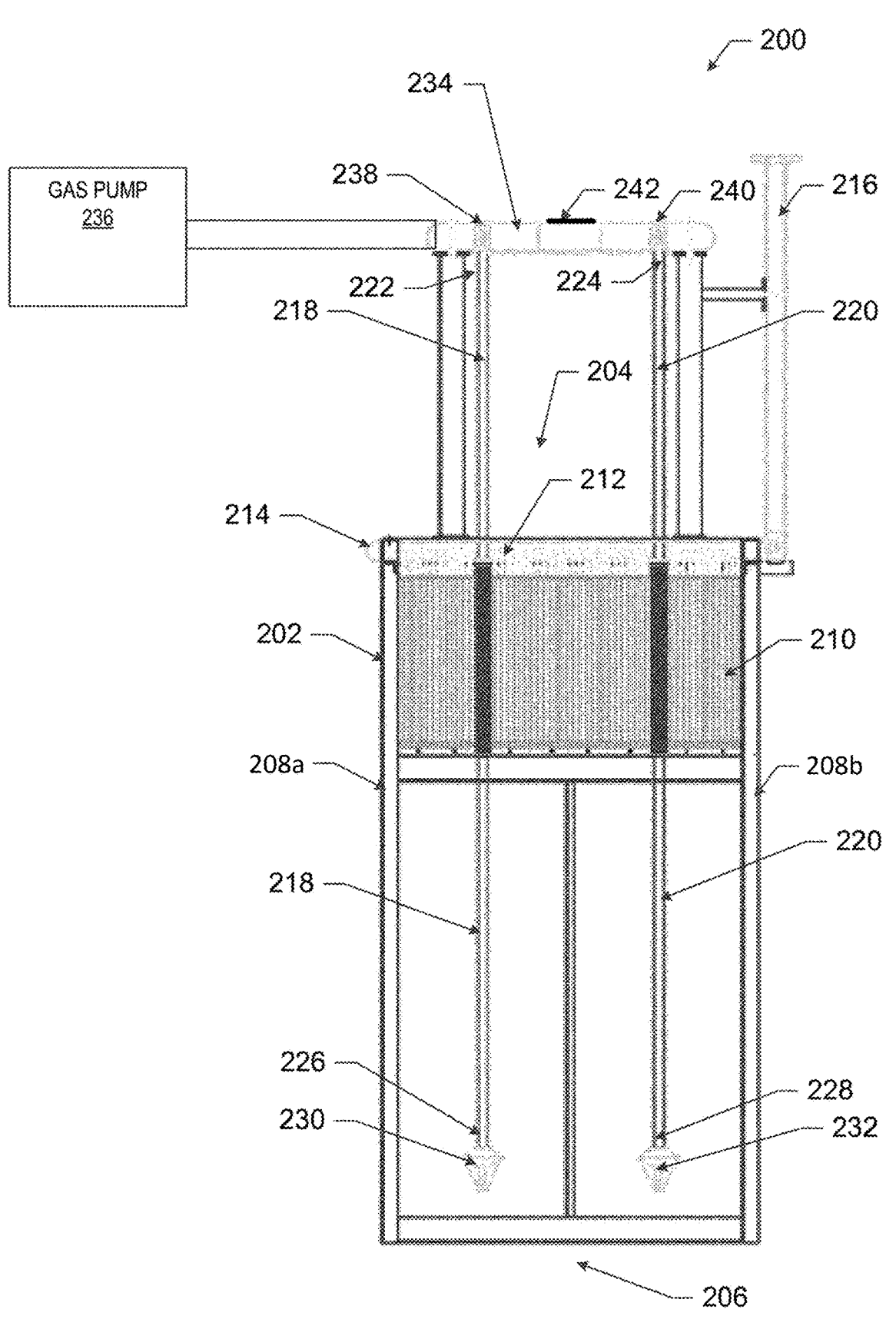
FIG. 2, FIG. 3, and FIG. 4 show an example of a SMU with single drop aeration, in accordance with one or more embodiments.
Figures 3, 4:
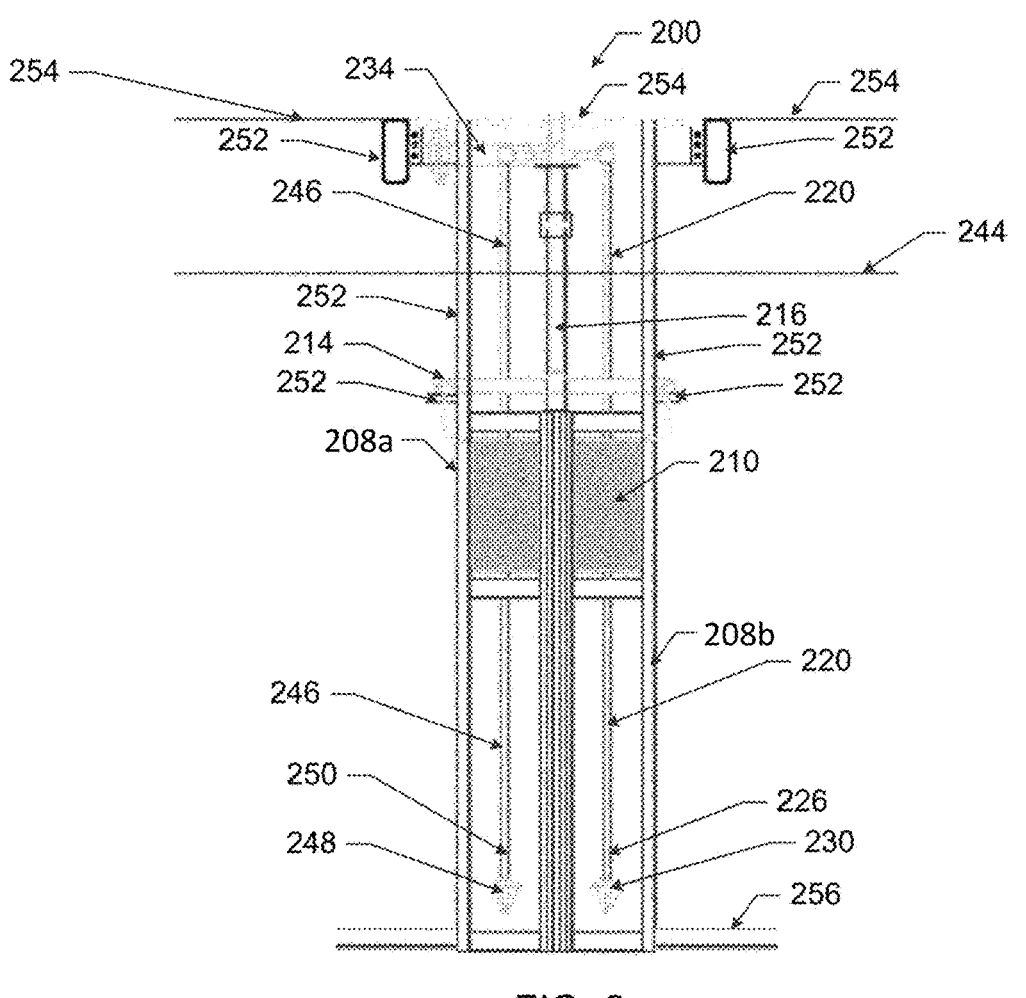

Attention is now turned to FIG. 2 through FIG. 4. FIG. 2 through FIG. 4 show different views of one embodiment of the SMU with single drop aeration described herein (e.g., the single drop SMU (200)). Thus, FIG. 2 through FIG. 4 share common reference numerals that refer to common objects having common descriptions.

FIG. 2 shows an example of the SMU (124) shown in FIG. 1. Thus, single drop SMU (200) may be used in place of the SMU (124) shown in FIG. 1. The single drop SMU (200) may be referred to as a submerged membrane unit with single drop aeration. All or part of the single drop SMU (200) may be submerged within the tank holding the wastewater. As explained above, and further below, the single drop SMU (200) includes a membrane array (210). The term "single drop aeration" refers to gas lines that drop from above the membrane unit, through or around the membrane array, to below the membrane array. Thus, even though multiple lines may pass through the membrane array, the entire single drop SMU (200) would still be considered a "single drop" SMU.

The single drop SMU (200) may be characterized as a housing (202) having a first side (204) and a second side (206) opposed to the first side. One or more walls (208*a*, 208*b*) are disposed between the first side (204) and the second side (206). The one or more walls (208*a*, 208*b*) form at least a partially enclosed space inside the housing (202). For example, the wall may form a rectangular box that has an open top (at the first side (204)) and an open bottom (at the second side (206)), such as shown in the example of FIG. 5 through FIG. 9.

However, the housing (202) and the one or more walls (208*a*, 208*b*) may have different shapes. For example, the housing (202) and the one or more walls (208*a*, 208*b*) may form a round shape, a curved shape, a complex shape, etc. In any case, the housing (202) and the one or more walls (208*a*, 208*b*) provide a structure for supporting the other components of the single drop SMU (200).

A membrane (210) is mounted to the one or more walls (208*a*, 208*b*), at least indirectly, inside the housing (202). Theoretically, the membrane (210) could be a single pipe or fluid line. However, in some embodiments, the membrane (210) may be an array of many membranes (i.e. pipes or tubes) that are disposed within the housing (202). Thus, as used herein, the term "membrane (210)" refers to any of: A single membrane, an array of multiple membranes, or multiple arrays of multiple membranes. Each membrane, pipe, or tube that forms the membrane (210) or the membrane array may be referred-to in some embodiments as a capillary.

In an embodiment, multiple membranes may form a ceramic flat sheet membrane array, such as a Meidensha CH250-1000TM100-U1DJ. The membrane array may be applied to various waters containing solvents, oil, chemicals and/or suspended solids, as described above and further below.

The membrane (210) may be either vertically or horizontally disposed within the housing (202), or disposed at some other angle. For example, an array of membranes may be mounted to one or more sides of the one or more walls (208a, 208b) in parallel rows, the array of membranes arranged in about parallel rows. An example of this arrangement is shown in FIG. 5 through FIG. 9.

The membrane (210) may be connected to a connection line, such as connection line (212). The connection line (212) is a fluid line that connects the membrane (210) to a permeate manifold (214). When an array or multiple arrays of membranes are present, multiple connection lines (including connection line (212)) connect to the permeate manifold (214). In an embodiment, multiple arrays of membranes with multiple pluralities of connection lines may be connected to the permeate manifold (214).

As indicated above, the membrane (210) includes one or more pores (not shown). The pores are sized and dimensioned to filter out particulates of pre-determined size, but to allow permeate to pass into the membranes. Thus, permeate flows into the membrane (210), through the connection line (212), into the permeate manifold (214), and then is pumped into a permeate line (216) for further processing.

Returning to the single drop SMU (200), one or more drop pipes, such as first drop pipe (218) or second drop pipe (220) are disposed inside the housing (202) and through the membrane (210) or membrane array. Thus, for example, the first drop pipe (218) and the second drop pipe (220) extend from above the water level and one or more walls (208a, 208b), pass through the opening in a first side (204) of the housing, through the membrane (210), and extend towards the second side (206) of the housing.

The term "through the membrane" means that the drop pipe passes through a level at which the membrane (210) is located in the housing (202), relative to other parts of the single drop SMU (200). However, the term "through the membrane" does not imply that the drop pipe passes into, penetrates, or is in fluid communication with the membrane (210). Thus, for example, the term "through the membrane" contemplates that the drop pipe passes beside or next to or at any point inside the housing (202), but without penetrating or becoming in fluid communication with the membrane (210) or any other membrane in an array of membranes. An example of such an arrangement is shown in FIG. 5 through FIG. 9. In other words, gas from the first drop pipe (218) or second drop pipe (220) (or other drop pipes) does not interact with the effluent passing through the membrane (210) or array of membranes.

The one or more drop pipes have a proximal end, such as first proximal end (222) for the first drop pipe (218) and second proximal end (224) for the second drop pipe (220). The term "proximal" refers to an origin end of the drop pipe (or other aspect of the single drop SMU (200)) that is disposed further away from a bottom of a tank in which the single drop SMU (200) is placed. The one or more drop pipes also have a distal end, such as first distal end (226) for the first drop pipe (218) and second distal end (228) for the second drop pipe (220). The term "distal" refers to a termination end of the drop pipe (or other aspect of the drop SMU (200)) that is disposed closer to the bottom of the tank in which the drop SMU (200) is placed. Thus, the proximal ends are closer to the first side (204) than the distal ends. Likewise, the distal ends are closer to the second side (206) than the proximal ends.

The single drop SMU (200) might include one or more diffusers, such as first diffuser (230) and second diffuser (232). A diffuser is a component configured to serve as an outlet for the drop pipes. Thus, for example, first diffuser (230) is connected to first drop pipe (218) and second diffuser (232) is connected to second drop pipe (220). The diffusers may terminate at or a distance from the second side (206), and thus may be disposed fully within the one or more walls (208a, 208b) of the housing of the single drop SMU (200). This arrangement is also shown in FIG. 5 through FIG. 9. The one or more diffusers may be, in an example, single-drop, medium bubble diffusers, such as the G-H Systems G-O Diffuser.

In use, gas is pumped through the proximal end of a corresponding drop pipe and then is emitted out of a nozzle at a distal end at the diffuser. The gas forms one or more bubbles that move up to a curved or straight flange that extends radially from the diffuser and/or the drop pipe. The bubbles move over the flange and thus are forced away from an axis of the diffuser as the bubbles rise through the wastewater. The bubbles pass around the membrane (210) and/or the other membranes in a membrane array. Additionally, the air inside the housing causes a lower density relative to outside the housing. The higher density outside the housing creates a differential pressure. The differential pressure causes the water to flow up through the housing. The water movement scours the membranes and helps prevent membrane clogging. In this manner, the membrane (210) and/or other membranes of a membrane array or arrays are continually cleaned during operation of the single drop SMU (200).

To facilitate the pumping of gas to the one or more drop pipes (e.g., first drop pipe (218) and second drop pipe (220)), a gas line (234) may be in fluid communication with the one or more drop pipes. Optionally, multiple gas lines may be used in place of a single gas line (234), as shown in FIG. 2. The gas line (234) is connected to a gas pump (236) and/or a source of gas (not shown) that is pumped through the drop pipes, through the diffusers, and into the wastewater. The gas pump (236) is configured to supply a pressurized gas (e.g., air or possibly some other gas from a source of gas) to the gas line (234).

Orifice tee connectors, such as first tee connector (238) and second tee connector (240), may connect the gas line (234) to the one or more drop pipes (e.g., first drop pipe (218) and second drop pipe (220)). Optionally, a valve (242) may be provided to control the flow of gas through all of the drop pipes.

Attention is turned to FIG. 3. FIG. 3 shows the single drop SMU (200) of FIG. 2 turned 90 degrees about an axis that is parallel to the drop pipes. Reference numerals shown in FIG. 3 not described with respect to FIG. 3 are described with respect to FIG. 2. In the view of FIG. 3, the single drop SMU (200) is shown partially submerged beneath a water line (244), as when in use.

A third drop pipe (246) may be seen in the view of FIG. 3. A third diffuser (248) is disposed at a third distal end (250) of the third drop pipe (246). The third drop pipe (246) also is in fluid communication with the gas line (234).

FIG. 3 also shows a frame (252) which connects to the one or more walls (208a, 208b) that forms the housing of the single drop SMU (200). The frame (252) may be composed of a lattice of beams or bars that support and/or connect the other components of the single drop SMU (200). For example, the frame may be four posts connected to corresponding corners of the frame at the first side of the housing and the frame further may be an array of support beams. Such an arrangement is shown in FIG. 5 through FIG. 9.

In an embodiment, the permeate manifold (214) may be connected one or more of the bars of the frame (252) and/or to the one or more walls (208a, 208b) of the housing. As shown in a combination of FIG. 2 and FIG. 3, the permeate manifold (214) may wrap at least partially around the one or more walls (208a, 208b) of the housing.

Likewise, the frame (252) is connected to and supports the gas line (234). The frame (252) also may be used to suspend the one or more walls (208a, 208b) and other components of the single drop SMU (200) from an anchor surface (254), or serve as a means to lift and move the single drop SMU (200).

Optionally, the single drop SMU (200) may also include one or more setoffs, such as setoff (256). The setoff (256) is a bar, beam, or rod that is connected to and extends outwardly from the one or more walls (208a, 208b) of the housing. The setoff (256) may be used to secure the single drop SMU (200) to a wall of a tank, to separate or connect the single drop SMU (200) to other SMU's, or to otherwise provide spacing between the single drop SMU's (200) and other objects, and/or to help pack and transport multiple SMU's.

Attention is now turned to FIG. 4, which shows a top-down view of the single drop SMU (200) shown in FIG. 2 and FIG. 3. In addition to the first drop pipe (218), second drop pipe (220), and third drop pipe (246), a fourth drop pipe (258) is shown connected to the gas line (234). Also shown is the membrane (210) and the connection line (212) that connect the membrane (210) to the permeate manifold (214) and then to the permeate line (216). The frame (252) is also shown for reference.

While FIG. 2 through FIG. 4 shows a configuration of components, other configurations may be used without departing from the scope of the one or more embodiments. For example, various components may be combined to create a single component. As another example, the functionality performed by a single component may be performed by two or more components. As still another example, more or fewer drop pipes may be present, more or fewer membranes or membrane arrays may be used, aspects of the frame may or may not be present, and the wall may have different shapes other than an open rectangular box.

Attention is now turned to FIG. 5 through FIG. 9. FIG. 5 through FIG. 9 show views of a specific example of a single drop SMU, such as single drop SMU (200) of FIG. 2. The example of FIG. 5 through FIG. 9 does not limit the other examples described herein.

FIG. 5 through FIG. 9 should be considered together as one example. Thus, similar reference numerals in FIG. 5 through FIG. 9 refer to similar components having similar descriptions.

Figure 5:
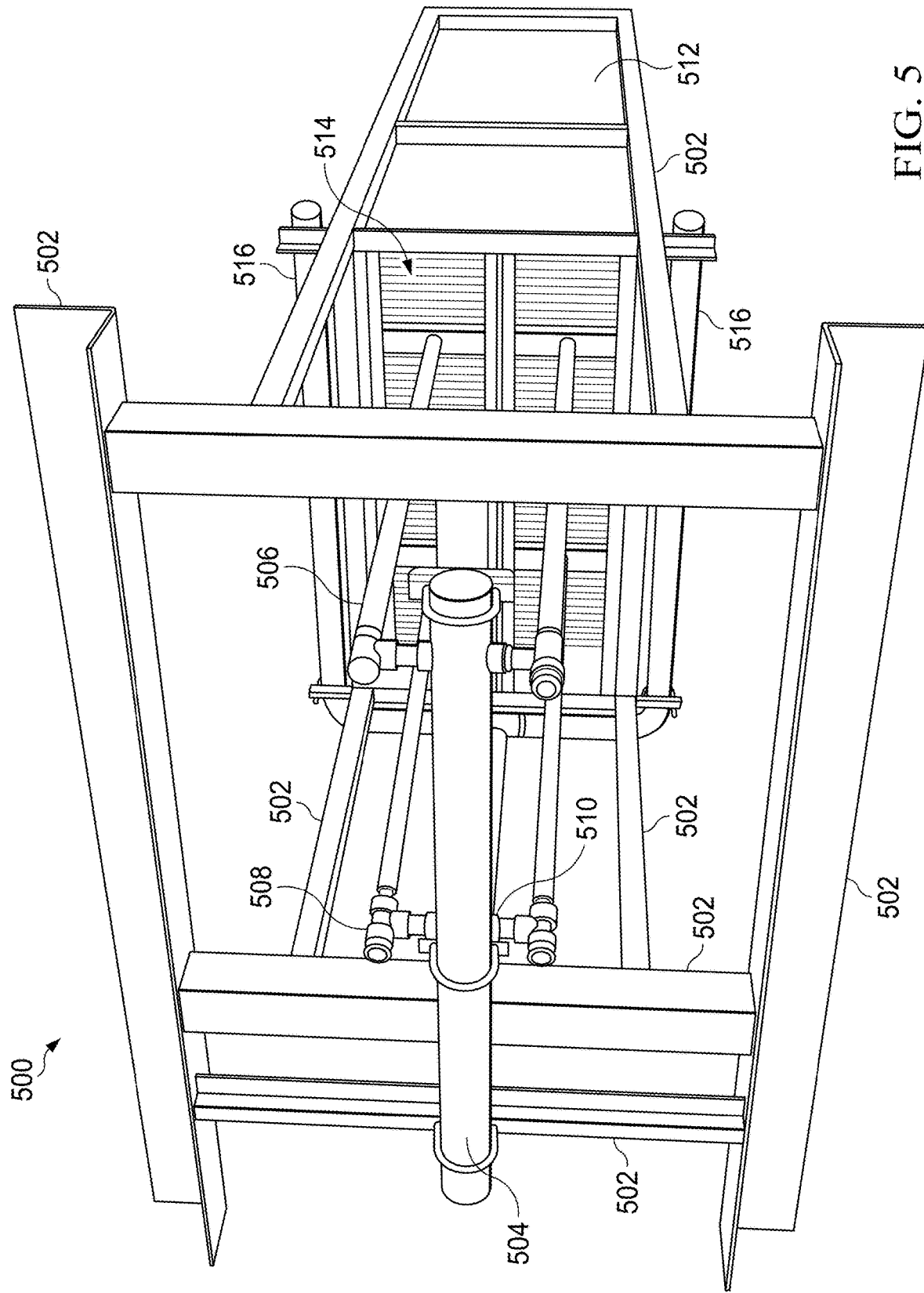
FIG. 5, FIG. 6, FIG. 7, FIG. 8, and FIG. 9 show another example of a SMU with single drop aeration, in accordance with one or more embodiments.

The single drop SMU (500) shown in FIG. 5 includes a frame (502). The frame (502) is a lattice of beams and brackets that support other components of the single drop SMU (500). For example, a gas line (504) is connected to the frame (502). The gas line (504) is connected to an air pump (not shown).

The gas line (504) is also connected to four drop pipes, such as drop pipe (506). For example, a tee connector (508) may be connected to a drop pipe, with the tee connector (508) connected to a half coupling (510) that extends from the gas line (504). Together, the tee connector (508) and half coupling (510) provide for fluid communication between the gas line (504) and the drop pipe (506) and the other drop pipes shown in FIG. 5.

A first wall (512) that forms part of the housing of the single drop SMU (500) is connected to the frame (502). The first wall (512) also supports and is connected to a membrane array (514). As can be seen in FIG. 5, the drop pipes (e.g., drop pipe (506)) are disposed through the membrane array (514), but do not penetrate any of the membranes in the membrane array (514) and are not in fluid communication with any of the membranes in the membrane array (514). Stated differently, the drop pipes (e.g., drop pipe (506))

extend through an opening in the side of the housing (defined partially by the first wall (512)) and down into the housing.

FIG. 5 also shows a permeate manifold (516) connected to the frame (502). The permeate manifold (516) is also disposed around three of four walls of the housing (but not around the first wall (512) shown in FIG. 5).

Figure 6:
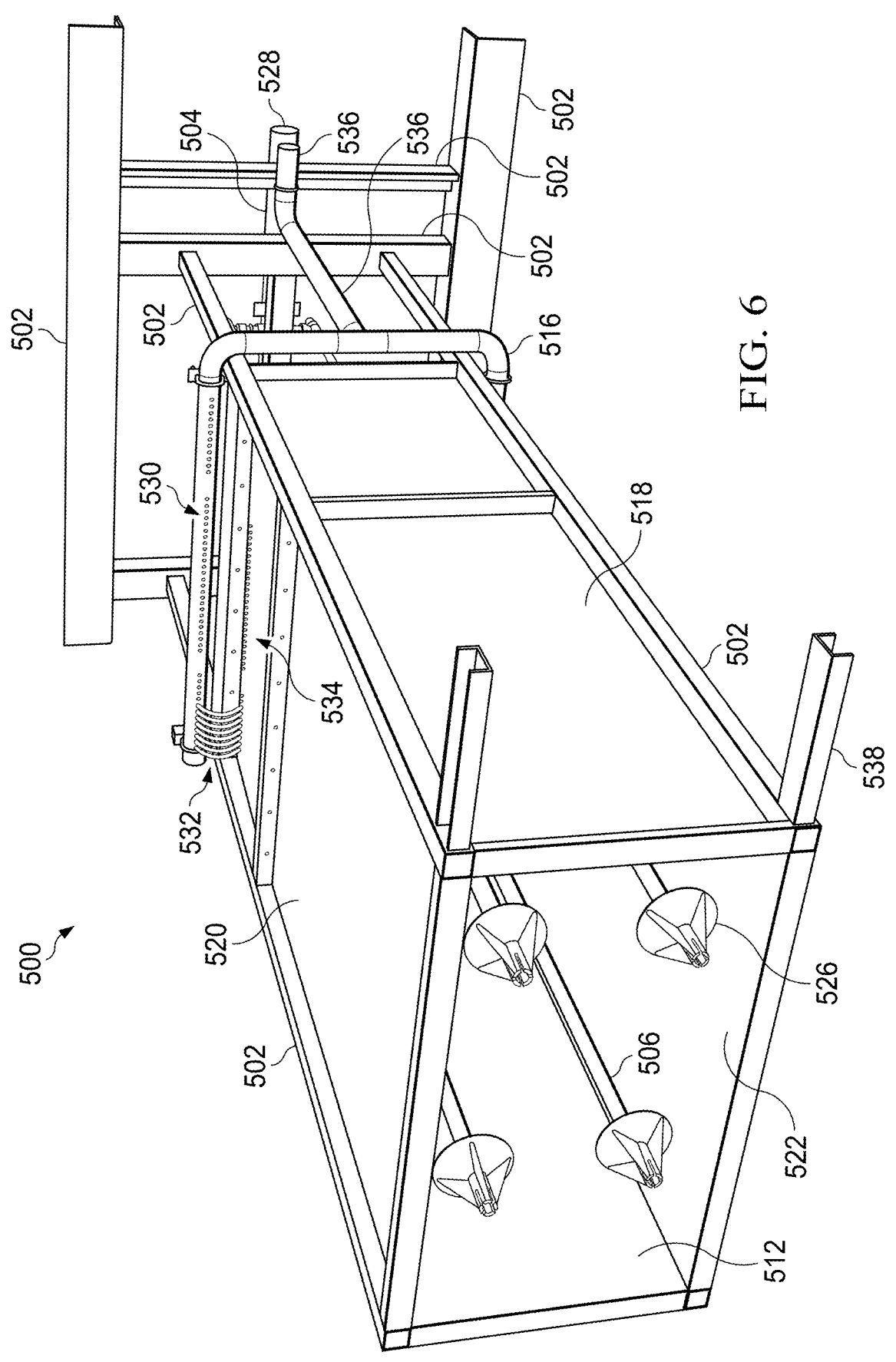

Attention is turned to FIG. 6, which shows another view of the single drop SMU (500). A different perspective of the frame (502) and the housing is shown. Thus, for example, a second wall (518), opposite the first wall (512) (also shown in FIG. 5) is shown. A third wall (520) and a fourth wall (522) are connected to the first wall (512) and second wall (518) to form a rectangular box.

The drop pipe (506) (also shown in FIG. 5) terminates a space above a termination point of the opening in the housing defined by the first wall (512), the second wall (518), the third wall (520), and the fourth wall (522). As can be seen, four drop pipes are present in the example. A diffuser (e.g., diffuser (526)) is connected to the end of each of the drop pipes. While the diffusers are optional, the diffusers help to create a distribution of bubbles that may be considered favorable in some embodiments.

As explained above, gas is pumped from a gas pump (not shown) to a gas header (528), through the gas line (504), into the drop pipes (e.g., drop pipe (506)), and through the diffusers (e.g., diffuser (526)). As the diffusers are submerged, gas bubbles will form at the diffusers and then float upwardly, past the membrane array (514) (shown in FIG. 5) and to the surface of the water.

FIG. 6 also shows another perspective of the permeate manifold (516). A number of connection openings (e.g., connection opening (530)) are disposed in the permeate manifold (516). Connection lines (e.g., connection line (532)) connect ones of the connection openings to outlets (e.g., outlet (534)) of the membrane array (514) (shown in FIG. 5). In this manner, each membrane of the permeate manifold (516) is placed in fluid communication with the permeate manifold (516).

In turn, the permeate manifold (516) feeds to a permeate line (536). The permeate line (536) channels permeate from the permeate manifold (516) to further processing (e.g., to the permeate tank (128) shown in FIG. 1).

Optionally, a setoff (538) may be connected to the frame (502). The setoff (538) may be used to secure the single drop SMU (500) against a tank wall, or for other purposes as described above. Also optionally, the SMU could be mounted to the floor or suspended from a frame or bridge across the basin or SMU tank.

Figure 7:
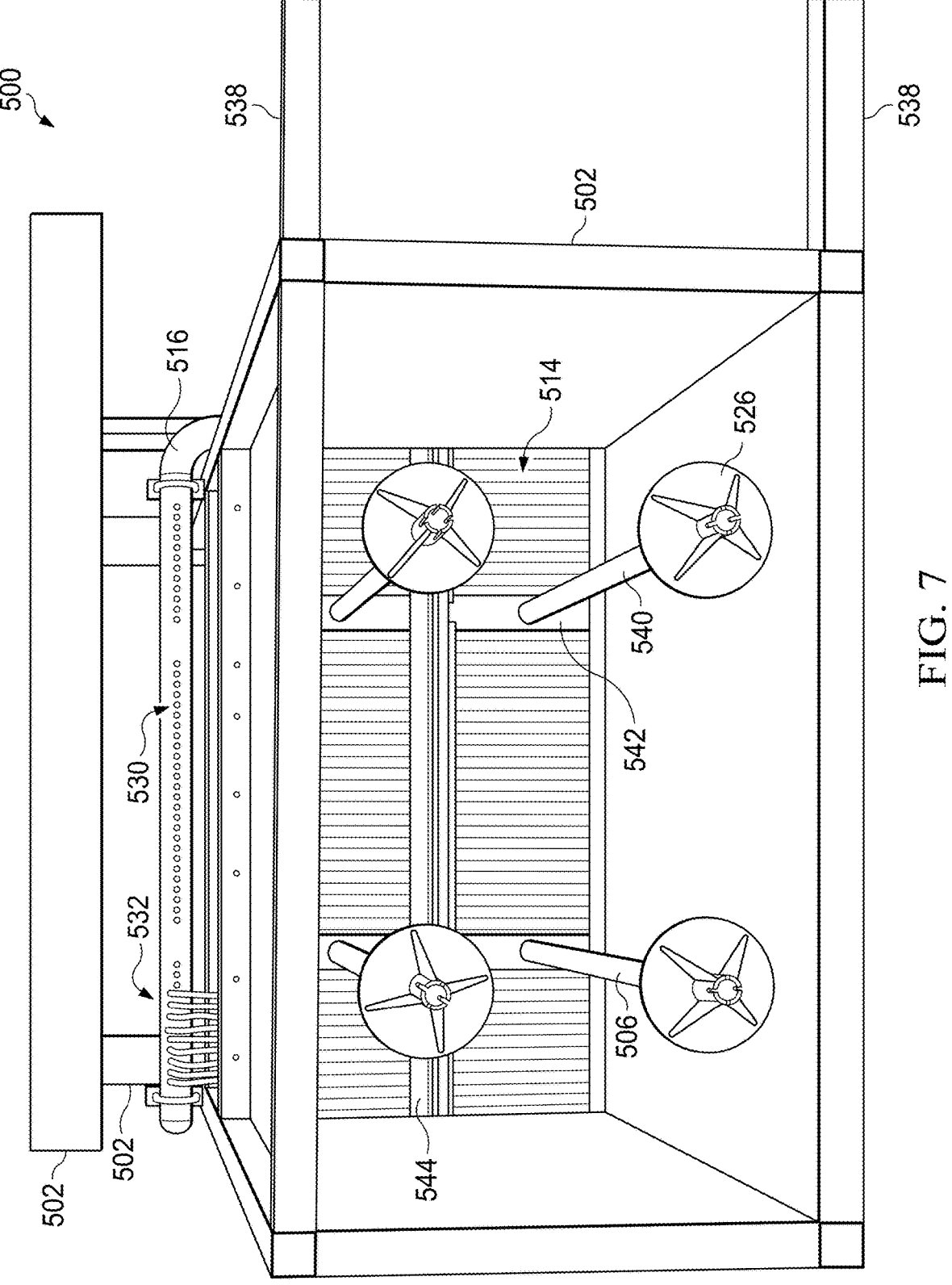

Attention is now turned to FIG. 7. FIG. 7 shows another view of the single drop SMU (500) shown in FIG. 5 and FIG. 6. For reference, FIG. 7 shows, from below, the frame (502), the membrane array (514), the permeate manifold (516), the connection opening (530), the connection line (532), and the setoff (538). The diffuser (526) is shown as depending from second drop pipe (540).

Also shown in FIG. 7 are components used to allow the drop lines (e.g., the drop pipe (506) and the second drop pipe (540)) to pass through the membrane array (514). In particular, cross bars (e.g., cross bar (542)) are disposed across the membrane array (514). Membranes are present in the area of the membrane array (514). Thus, the drop lines may pass through the cross bars without penetrating or interfering with operation of the membranes in the membrane array (514).

Optionally, a support beam (544) may be disposed under the membrane array (514). The support beam (544) provides additional support for the membrane array (514). Thus, in one embodiment, instead of being mounted to the walls of the housing, the membrane array (514) rests on the support beam (544) and/or L-brackets that may optionally be mounted to the walls of the housing. In this manner, the membrane array (514) may be relatively quickly removed for deep cleaning and replaced with a fresh membrane array.

Figure 8:
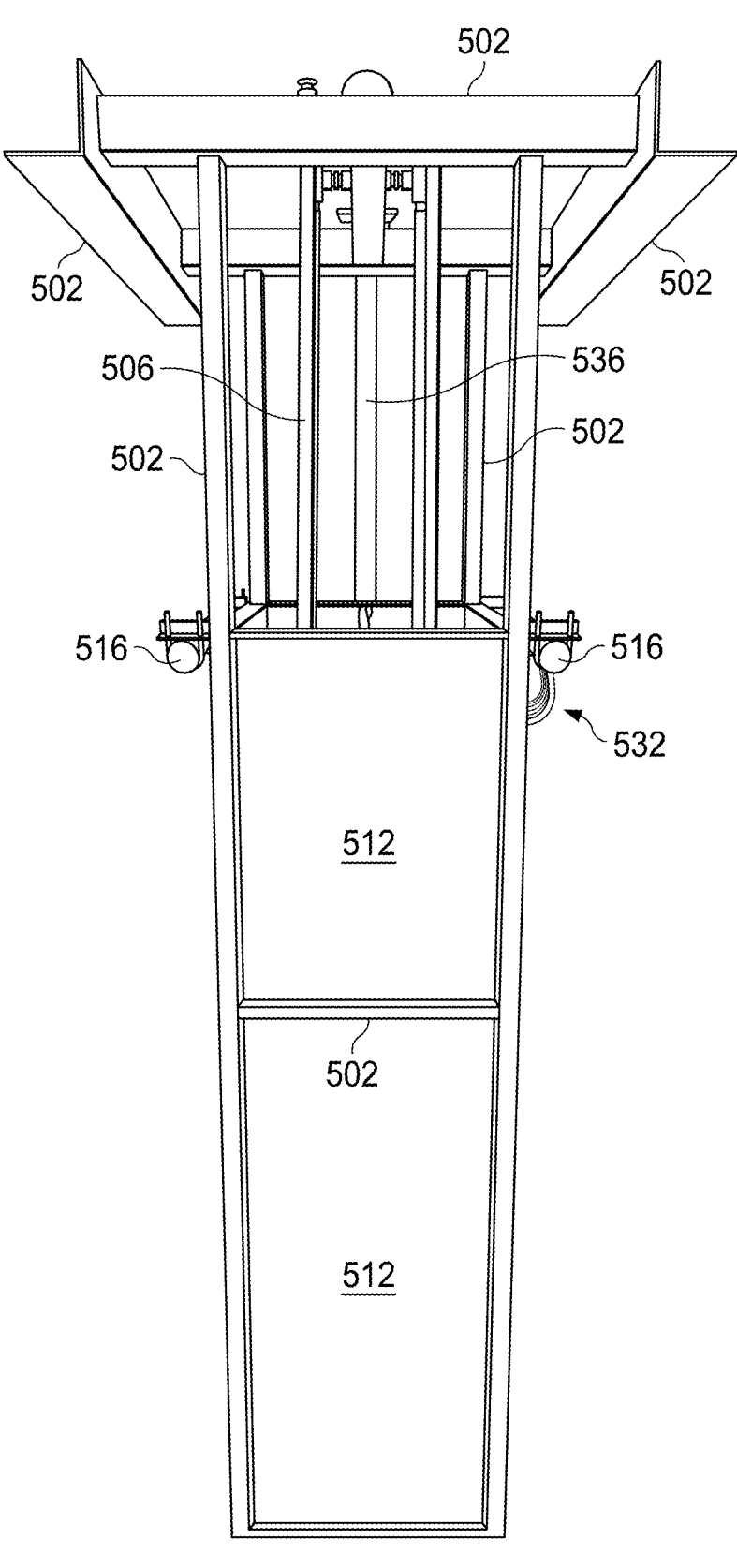

Attention is now turned to FIG. 8. FIG. 8 shows another view of the single drop SMU (500) shown in FIG. 5 through FIG. 7. For reference, FIG. 8 also shows the frame (502), the first wall (512), the permeate manifold (516), the connection line (532), the drop pipe (506), and the permeate line (536).

Figure 9:
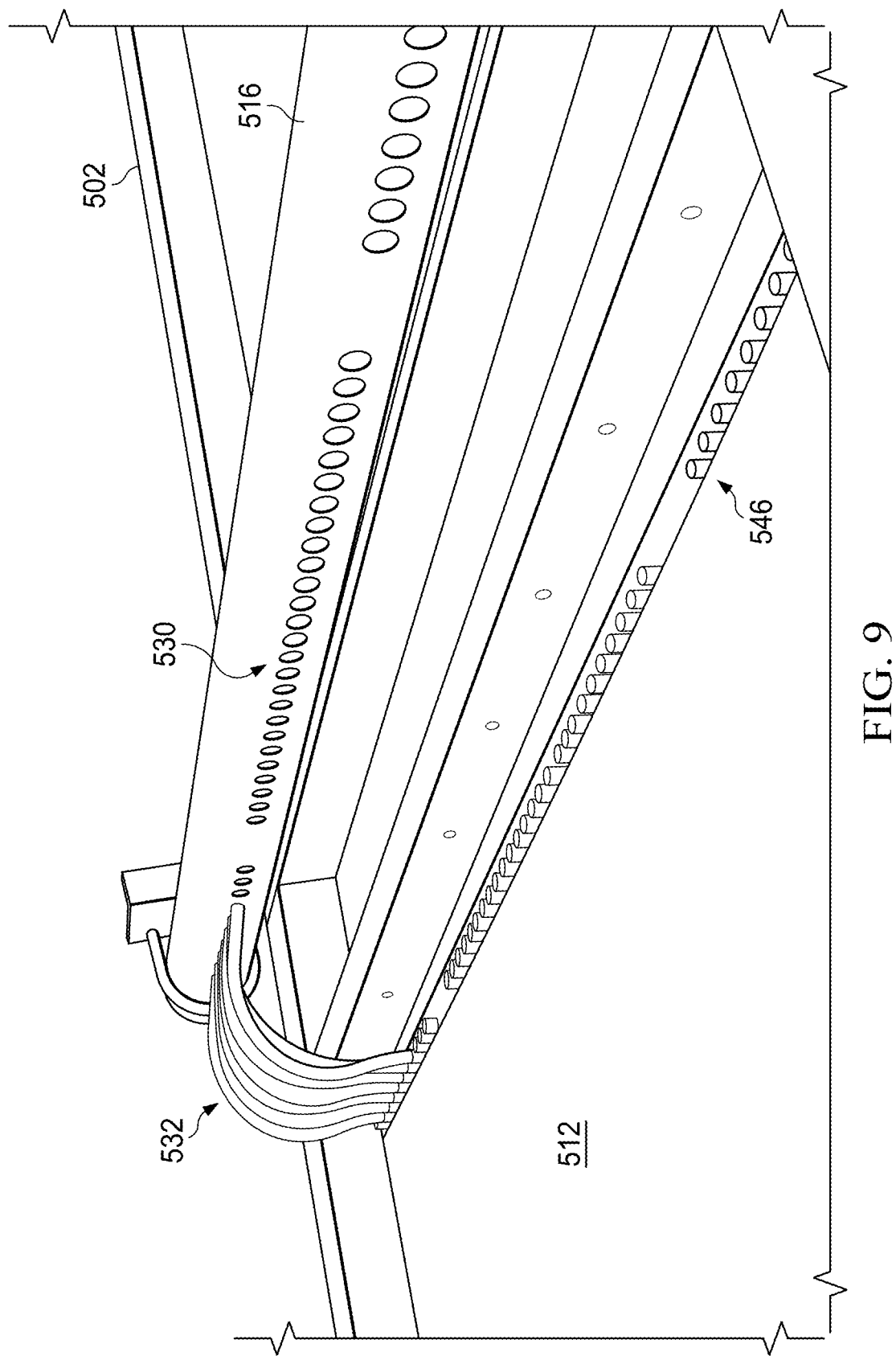

Attention is now turned to FIG. 9. FIG. 9 shows a close-up view of the permeate manifold (516). The frame (502) and first wall (512) are shown for reference, as are the connection opening (530) and the connection line (532). In addition, FIG. 9 shows membrane outlets (e.g., membrane outlet (546)). The connection lines provide fluid communication between the membrane outlets and the connection openings. In this manner, ones of the membranes (i.e. capillaries) may be placed in fluid communication with the permeate manifold (516).

Figure 10:
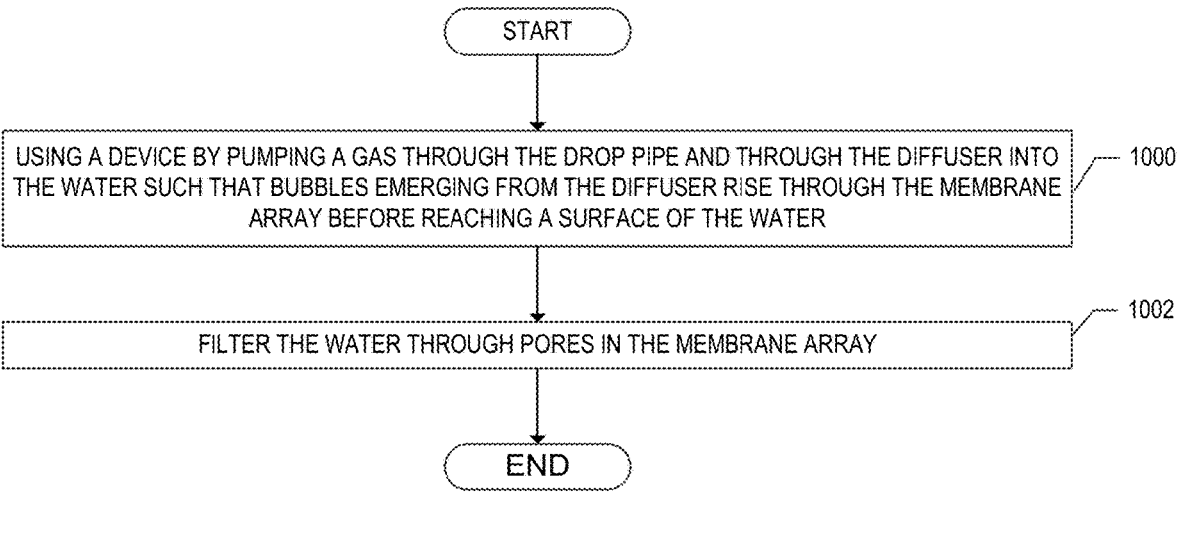
FIG. 10 shows a method of treating water, in accordance with one or more embodiments.

Attention is now turned to FIG. 10, which is a flowchart of a method for treating water. The method of FIG. 10 may be implemented using the submerged membrane unit with single drop aeration variations described with respect to FIG. 2 through FIG. 9.

Step 1000 includes using a device (such as the devices described with respect to FIG. 2 through FIG. 9) by pumping a gas through the drop pipe and through the diffuser into the water such that bubbles emerging from the diffuser rise through the membrane array before reaching a surface of the water. In one embodiment, the method may terminate thereafter.

In another embodiment, the method may also include step 1002. Step 1002 includes filtering the water through pores in the membrane array. Filtering produces permeate that flows from the membrane array, to the permeate manifold, and into a permeate line connected to permeate manifold. The bubbles cause flow through the membranes that urge solids away from the pores in the membrane array. In one embodiment, the method of FIG. 10 may terminate thereafter.

The method of FIG. 10 may include more or fewer steps. For example, the method of FIG. 10 may include, prior to pumping the gas, placing the device into a tank of a water or wastewater treatment facility. In another variation, other water treatment steps may be added to the method.

Thus, while the various steps in this flowchart are presented and described sequentially, one of ordinary skill will appreciate that some or all of the steps may be executed in different orders, may be combined or omitted, and some or all of the steps may be executed in parallel. Furthermore, in some embodiments the steps may be performed actively and/or passively. Thus, the one or more embodiments are not necessarily limited by the examples provided herein.

In the preceding detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A was, at least at some point, separate from component B, but then was later joined to component B in either a fixed or a removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A submerged membrane unit comprising:
a housing having a top side, a bottom side opposed to the top side, and at least one wall disposed between the top side and the bottom side, wherein the wall forms at least a partially enclosed space inside the housing;
a membrane mounted to the wall inside the housing, the membrane comprising a set of capillaries having one or more pores that are configured to filter out particulates of pre-determined size from a permeate that passes into the capillaries when the membrane is submerged underwater;

a plurality of connecting lines connecting the set of capillaries to a permeate manifold disposed at least partially around the wall along the top side of the housing, wherein the permeate flows through the set of capillaries in a direction from the bottom side to the top side and is removed from the membrane at the top side of the housing via the permeate manifold;

a drop pipe disposed inside the housing and through the membrane, the drop pipe having a proximal end and a distal end, wherein:

the proximal end is above the membrane and being closer to the top side than the distal end; and the distal end is below the membrane and being closer to the bottom side than the proximal end; and a diffuser connected to the distal end of the drop pipe.

2. The submerged membrane unit of claim 1, further comprising:

a gas line connected to the proximal end of the drop pipe; and a gas pump connected to the gas line, wherein the gas pump is configured to supply a pressurized gas through the gas line.

3. The submerged membrane unit of claim 1, further comprising:

an array of membranes mounted to the wall in parallel rows, the array of membranes arranged in about parallel rows, wherein the membrane is one of the array of membranes, and wherein the array of membranes further comprise a plurality of pores disposed in membranes of the array of membranes.

4. The submerged membrane unit of claim 1, further comprising:

a plurality of additional drop pipes disposed inside the housing and through the membrane, the plurality of additional drop pipes having corresponding proximal ends and corresponding distal ends, the corresponding distal ends being closer to the bottom side than the top side.

5. The submerged membrane unit of claim 1, further comprising:

a permeate manifold disposed at least partially around the wall of the housing;

a plurality of connecting lines connecting the permeate manifold to capillaries of the membrane.

6. The submerged membrane unit of claim 5, further comprising:

a permeate line connected to the permeate manifold and configured to receive permeate from the permeate manifold.

7. The submerged membrane unit of claim 1, wherein the submerged membrane unit further comprises:

a tee connector configured to provide a fluid connection from the drop pipe to a gas line;

a valve connected to the gas line and configured to control a flow of gas in the gas line; and a gas pump in fluid communication with the gas line.

8. The submerged membrane unit of claim 1, further comprising:

a frame connected to the wall of the housing.

9. The submerged membrane unit of claim 8, further comprising:

the permeate manifold connected to the frame and disposed at least partially around the wall of the housing.

10. The submerged membrane unit of claim 8, further comprising:

a gas line connected to the frame and in fluid communication with the drop pipe; and a gas pump in fluid communication with the gas line.

11. The submerged membrane unit of claim 8, further comprising:

a setoff connected to the wall, opposite the frame.

12. The submerged membrane unit of claim 8, wherein the wall comprises a rectangular box having a first opening on the top side and a second opening on the bottom side, wherein the membrane is attached to four sides of the wall, wherein the frame comprises four posts connected to corresponding corners of the frame at the top side of the housing and the frame further comprises an array of support beams, and the drop pipe is disposed through both of the top side and the membrane.

13. The submerged membrane unit of claim 12, wherein the diffuser terminates at, below, or a distance above the bottom side within the housing.

14. A water treatment system, comprising:

a clarifier stage;

a submerged membrane unit disposed within the clarifier stage, the submerged membrane unit comprising:

a housing having a top side, a bottom side opposed to the top side, and at least one wall disposed between the top side and the bottom side, wherein the wall forms at least a partially enclosed space inside the housing;

a membrane mounted to the wall inside the housing, the membrane comprising a set of capillaries having one or more pores that are configured to filter out particulates of pre-determined size from a permeate that passes into the capillaries when the membrane is submerged underwater;

a plurality of connecting lines connecting set of capillaries to a permeate manifold disposed at least partially around the wall along the top side of the housing, wherein the permeate flows through the set of capillaries in a direction from the bottom side to the top side and is removed from the membrane at the top side of the housing via the permeate manifold;

a drop pipe disposed inside the housing and through the membrane, the drop pipe having a proximal end and a distal end, the distal end being closer to the bottom side than the proximal end; and a diffuser connected to the distal end of the drop pipe; and a gas pump connected to the drop pipe and configured to pump gas through the drop pipe.

15. The water treatment system of claim 14, further comprising:

a manifold disposed at least partially around the wall of the housing;

a plurality of connecting lines connecting the manifold to capillaries of the membrane, wherein the manifold is in fluid communication with a permeate line.

16. The water treatment system of claim 14, further comprising:

a frame, comprising an array of support beams, connected to the housing, wherein the wall comprises a rectangular box having a first opening the top side and a second opening on the bottom side, wherein the membrane is connected to the wall and is in fluid communication with water in the clarifier stage, and wherein the drop pipe is disposed through both of the top side and the membrane.

17. The water treatment system of claim 16, wherein the diffuser terminates at, below, or a distance above the bottom side within the housing.

18. A method of treating water using a submerged membrane unit, comprising:

submerging the submerged membrane unit in wastewater, wherein the submerged membrane unit comprises:

a housing having a top side, a bottom side opposed to the top side, and at least one wall disposed between the top side and the bottom side, wherein the wall forms at least a partially enclosed space inside the housing, a membrane array mounted to the wall inside the housing, the membrane comprising a set of capillaries having one or more pores that are configured to filter out particulates of pre-determined size from a permeate that passes into the capillaries when the membrane is submerged underwater, a plurality of connecting lines connecting set of capillaries to a permeate manifold disposed at least partially around the wall along the top side of the housing, wherein the permeate flows through the set of capillaries in a direction from the bottom side to the top side and is removed from the membrane at the top side of the housing via the permeate manifold, a drop pipe disposed inside the housing and through the membrane array, the drop pipe having a proximal end and a distal end, the distal end being closer to the bottom side than the proximal end, and a diffuser connected to the distal end of the drop pipe, wherein the drop pipe and the diffuser extend into the water; and pumping a gas through the drop pipe and through the diffuser into the water such that bubbles emerging from the diffuser rise through the membrane array before reaching a surface of the water.

19. The method of claim 18, wherein the submerged membrane unit further comprises a permeate manifold disposed at least partially around the wall of the housing and a plurality of connecting lines connecting the permeate manifold to capillaries of the membrane array, wherein the membrane array is disposed under the surface of the water, and wherein the method further comprises:

filtering the water through pores in the membrane array, wherein filtering produces permeate that flows from the membrane array, to the permeate manifold, and into a permeate line connected to permeate manifold, and wherein the bubbles cause water flow through the membranes that urge solids away from the pores in the membrane array.

20. The method of claim 18, further comprising:

placing the submerged membrane unit into a tank of a water treatment facility.

* * * * *